(12) United States Patent
Smith et al.

(10) Patent No.: US 7,327,839 B2
(45) Date of Patent: Feb. 5, 2008

(54) CABLES, SYSTEMS AND METHODS FOR WIRING A STRUCTURE FOR TELEPHONE SERVICE

(75) Inventors: Donald Scott Smith, Vinemont, AL (US); Steven L. Ryals, Pinson, AL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 746 days.

(21) Appl. No.: 10/818,276

(22) Filed: Apr. 5, 2004

(65) Prior Publication Data

US 2005/0252115 A1 Nov. 17, 2005

(51) Int. Cl.
*H04M 3/00* (2006.01)
*H04M 5/00* (2006.01)

(52) U.S. Cl. .................. 379/326; 174/113 R

(58) Field of Classification Search ............. 379/326; 175/113; 174/113 R
See application file for complete search history.

(56) References Cited

U.S. PATENT DOCUMENTS

| | | | | |
|---|---|---|---|---|
| 3,999,003 | A * | 12/1976 | Chevrolet et al. | 174/23 R |
| 4,142,729 | A * | 3/1979 | McLennan | 369/33.01 |
| 4,712,210 | A * | 12/1987 | Davis et al. | 370/296 |
| 5,884,829 | A * | 3/1999 | Wingert | 227/151 |
| 7,173,191 | B2 * | 2/2007 | Prescott | 174/113 C |
| 2005/0167149 | A1 * | 8/2005 | Prescott | 174/113 C |

OTHER PUBLICATIONS

Beldon.com Search Results, http://bwccat.belden.com/ecat/eCatalogServlet, Feb. 6, 2004, 1 page.

CCNA: Network Media Types at InformIT.com, http://www.informit.com/isapi/product_id~{967563CD-A039-47B7-85CB-C5A8485C464, Feb. 20, 2004, 7 pages.

PBI Media Broadband Group, http://www.broadband-pbimedia.com/ct/archives/0101/104_training.htm, Feb. 20, 2004, 5 pages.

South Central Rural Telephone Company, http://www.scrtc.com/howtoguides.html, Feb. 18, 2004, 9 pages.

Tangora Technologies Inc., http://www.tangoratechnologies.com/future.htm, Feb. 18, 2004, 3 pages.

* cited by examiner

*Primary Examiner*—Curtis Kuntz
*Assistant Examiner*—Alexander Jamal
(74) *Attorney, Agent, or Firm*—Myers Bigel Sibley & Sajovec, P.A.

(57) ABSTRACT

A method for wiring an architectural structure for telephone service includes providing a cable. The cable includes a sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductor members and the first pair of conductor members is separated from the second pair of conductor members by the partition wall. The method further includes: routing the cable through the architectural structure; routing the cable to a telephone service supply connection; and electrically connecting at least the conductors of the first pair of conductor members to the telephone service supply connection.

27 Claims, 4 Drawing Sheets

CABLES, SYSTEMS AND METHODS FOR WIRING A STRUCTURE FOR TELEPHONE SERVICE

FIELD OF THE INVENTION

The present invention relates to cables, systems and methods for wiring and, more particularly, to cables and systems and methods for telephone wiring.

BACKGROUND OF THE INVENTION

Typically, architectural structures such as houses are wired for telephone service using Residential Jack Terminating (RJT) wire or "house cable". Such cable includes four conductor members each including a conductor strand or wire and an insulation cover. The four conductor members are all helically twisted with one another.

Generally, only two conductors of the RJT cable are used for each circuit (in some cases, more than one service can be provided over a single pair of conductors). Thus, the first pair of conductors can be used to provide a first telephone service and the second pair of conductors of the RJT cable can be used to provide a second telephone service. Commonly, the first conductor pair is used to provide a traditional analog telephone service for transmitting low frequency (e.g., 0-4000 KHz) audio signals (commonly referred to as plain old telephone service or POTS). The second conductor pair may be used to provide a second POTS line or a digital or high frequency telephone service such as DSL. However, when the second conductor pair of the RJT cable is used in this manner, emissions from one conductor pair to the other may cause cross talk and line noise. In addition to being annoying, the cross talk may interrupt data services and cause outages. Cables specifically designed to carry data services tend to be flimsy and subject to damage if not carefully handled or protected.

SUMMARY OF THE INVENTION

According to embodiments of the present invention, a method for wiring an architectural structure for telephone service includes providing a cable. The cable includes a sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductor members and the first pair of conductor members is separated from the second pair of conductor members by the partition wall. The method further includes: routing the cable through the architectural structure; routing the cable to a telephone service supply connection; and electrically connecting at least the conductors of the first pair of conductor members to the telephone service supply connection.

According to further embodiments of the present invention, a system for wiring an architectural structure for telephone service includes a telephone service supply connection and a cable. The cable includes a sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductors and the first pair of conductor members is separated from the second pair of conductor members by the partition wall. The cable is routed through the architectural structure. The cable is routed to the telephone service supply connection. At least the conductors of the first pair of conductor members are electrically connected to the telephone service supply connection.

According to further embodiments of the invention, a cable includes a unitary, polymeric sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductors and the first pair of conductor members is electrically insulated from the second pair of conductor members by the partition wall.

According to still further embodiments of the invention, a cable includes a sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductors and the first pair of conductor members is separated from the second pair of conductor members by the partition wall. The sheath has a rectangular cross-section.

According to still further embodiments of the invention, a cable includes a sheath and first and second pairs of conductor members. The sheath includes first and second longitudinally extending sheath passages and a partition wall extending therebetween. Each of the conductor members is twisted about the other conductor member of its pair. Each of the conductor members includes a conductor and an insulation cover. The first pair of conductor members is disposed in the first sheath passage and the second pair of conductor members is disposed in the second sheath passage such that the sheath surrounds the first and second pairs of conductors and the first pair of conductor members is separated from the second pair of conductor members by the partition wall. The sheath includes a body portion formed of a first material and a longitudinally extending reinforcement member formed of a second, rigid or semi-rigid material, wherein the second material is more rigid than the first material.

The present invention will be appreciated by those of ordinary skill in the art from a reading of the figures and the detailed description of the preferred embodiments which follow, such description being merely illustrative of the present invention.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS OF THE INVENTION

Figure 1:
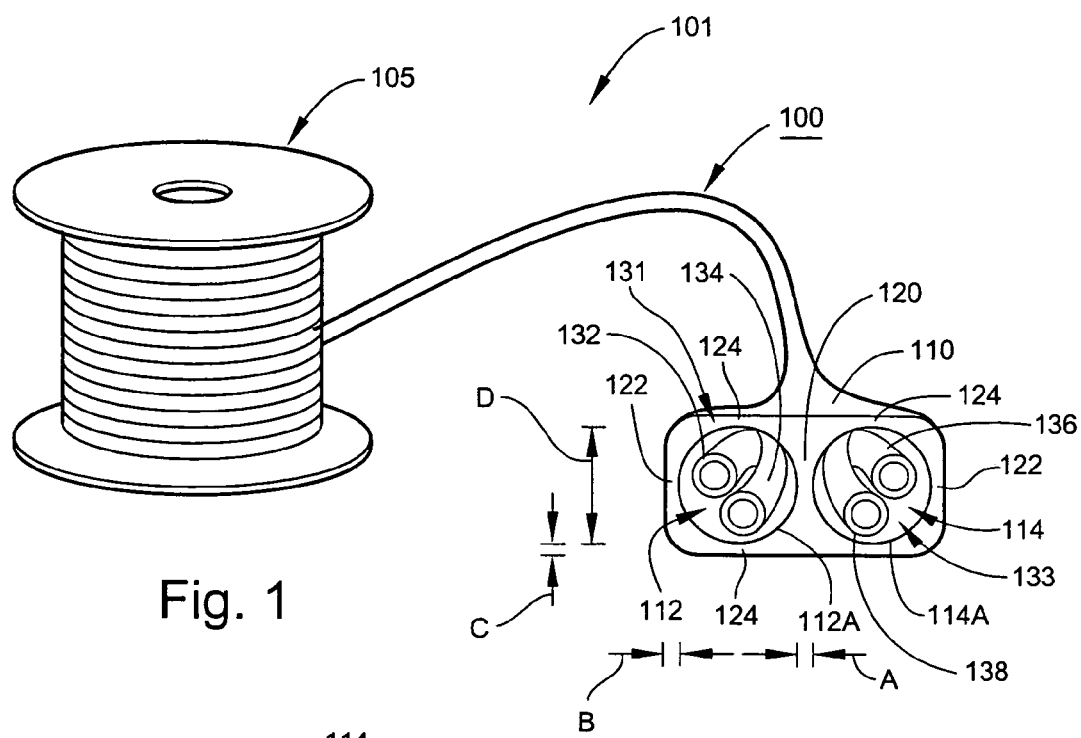
FIG. 1 is a perspective view of a cable package including cable according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of regions may be exaggerated for clarity. It will be understood that when an element such as a layer, region or substrate is referred to as being "on" or "connected to" another element, it can be directly on or directly connected to the other element or intervening elements may also be present. In contrast, when an element is referred to as being "directly on" or "directly connected to" another element, there are no intervening elements present.

As used herein, "telephone service" means wired telecommunications signals provided by a telephone service provider to a subscriber, and may include analog telephone signals (e.g., plain old telephone service (POTS)) and/or digital or broadband data signals.

Figure 2:
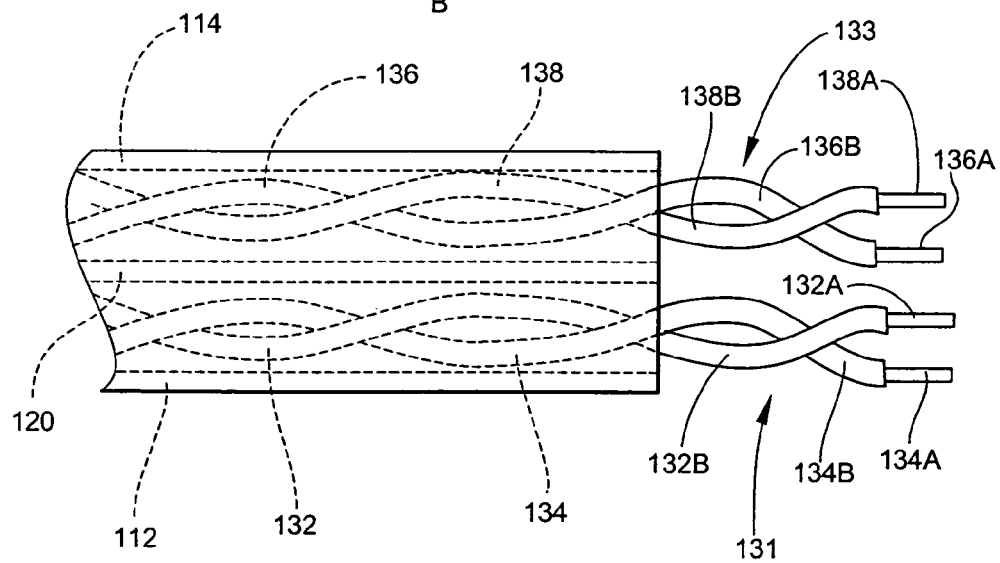
FIG. 2 is a fragmentary, top-plan view of the cable of FIG. 1.
Figure 3:
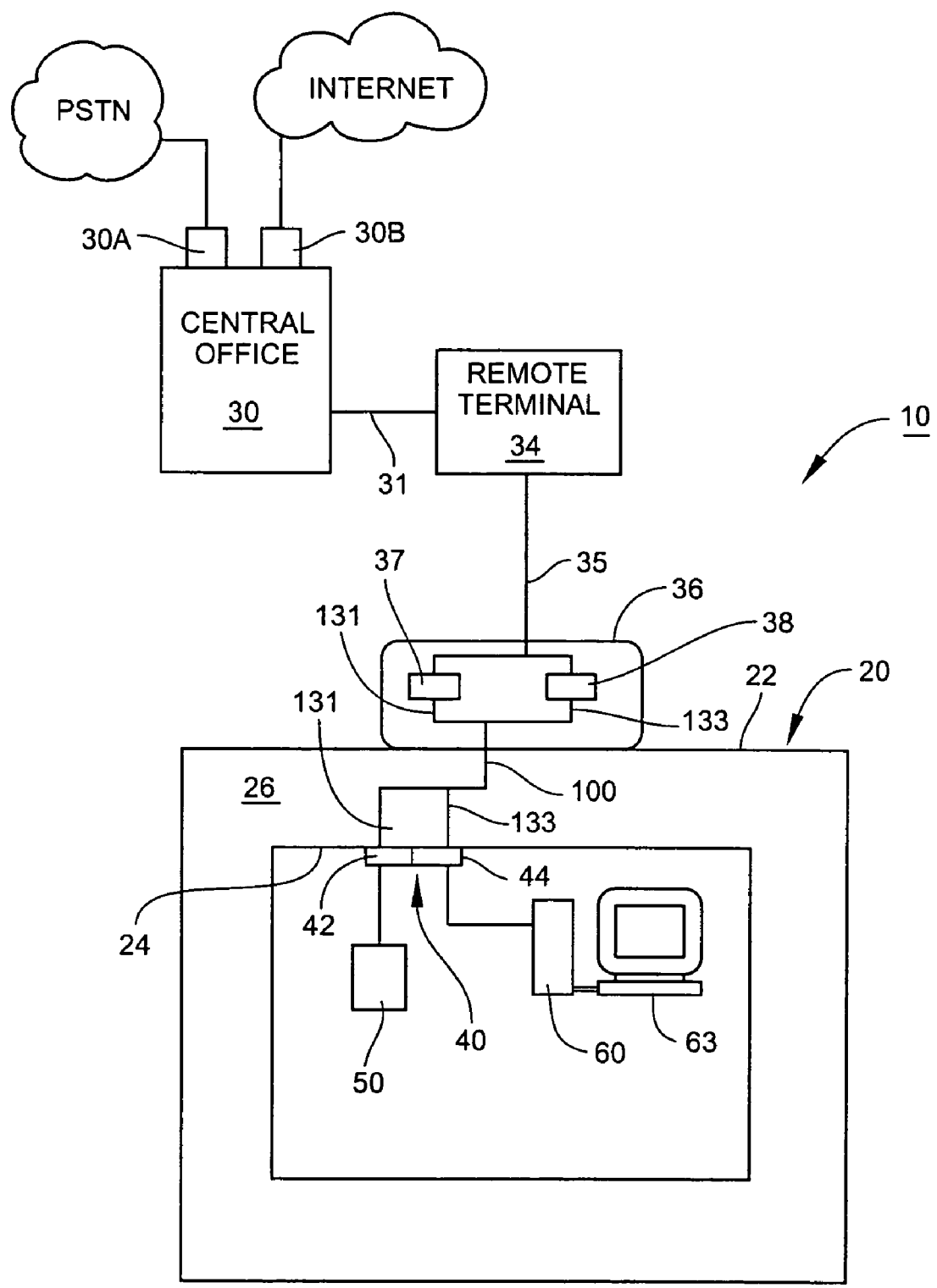
FIG. 3 is a schematic diagram of a telephone service system according to embodiments of the present invention and including the cable of FIG. 1.

With reference to FIGS. 1 and 2, a cable 100 according to embodiments of the present invention is shown therein. The cable 100 may be wound on a spool 105 to form a package 101 as shown in FIG. 1. The cable 100 may be used as part of a telephone service system 10 for an architectural structure 20 as shown in FIG. 3, for example.

The cable 100 includes a flexible sheath 110. The sheath 110 is formed of an electrically insulative material. The sheath 110 includes a pair of continuous, longitudinally extending, parallel passages 112, 114 formed therein. The passages 112, 114 terminate in end openings 112A, 114A, respectively. The passages 112, 114 are surrounded by outer walls 122, 124. The passages 112, 114 are further defined and separated from one another by a longitudinally extending partition wall 120. According to some embodiments and as illustrated in FIG. 1, the passages 112, 114 are circular in cross-section.

According to some embodiments and as shown, the sheath 110 has a unitary construction so that the partition wall 120 is integral with the walls 124. According to some embodiments, the sheath 110 is continuously unitarily formed, meaning that the partition wall 120 and the outer walls 122, 124 are formed by a selected process such that the sheath has a unitary construction without subsequent joining of the parts thereof (e.g., by bonding, adhering, welding or the like). For example, the sheath 110 may be continuously unitarily formed by extruding the sheath as a single continuous element. Alternatively, the sheath may be molded, cast or machined as a single continuous element.

The sheath 110, including the partition wall 120, is formed of a non-metallic material. The sheath 110 is formed of a material that is sufficiently flexible at operating conditions to allow winding and bending to facilitate routing. The sheath 110 may be formed of a polymeric material. For example, the sheath 110 may be formed of polymeric enamel, paper and oil, silicone rubber, polyvinyl chloride (PVC), polyethylene, polypropylene, and/or mixtures, blends and co-polymers thereof. According to some embodiments, the sheath 110 is formed of a material having a Young's modulus of less than 1 GPa, and according to further embodiments, less than 0.2 GPa. According to some embodiments, the sheath 110 is rectangular in cross-section as shown.

The cable 100 further includes a first conductor member pair 131 and a second conductor member pair 133. The conductor member pair 131 includes conductor members 132, 134. The conductor member pair 133 includes conductor members 136, 138. Each of the conductor members 132, 134, 136, 138 is an independently insulated wire including a respective conductor 132A, 134A, 136A, 138A and a respective insulation cover 132B, 134B, 136B, 138B.

The conductor members 132 and 134 are helically wound or twisted about or around one another and extend through the passage 112 and out through the opening 112A, as shown in FIG. 2. Similarly, the conductor members 136 and 138 are helically wound or twisted about one another and extend through the passage 114 and out through the opening 114A, as shown in FIG. 2. According to some embodiments and as shown, neither of the conductor members 132, 134 is wound or twisted with or about either of the conductor members 136, 138 (i.e., the conductor members of one pair are not twisted about or with the conductor members of the other pair).

The conductor members 132, 134, 136, 138 may be formed by any suitable means. For example, the conductor members may be formed by extruding the insulation covers 132B, 134B, 136B, 138B onto the conductors 132A, 134A, 136A, 138A. The conductors 132A, 134A, 136A, 138A may each be a single filament or multiple strands that are twisted or untwisted. According to some embodiments, the conductors 132A, 134A, 136A, 138A are formed of copper. According to some embodiments, the conductors have a gauge of at least 26 AWG. According to some embodiments, the conductors have a gauge of between about 19 and 26 AWG. The insulation covers 132B, 134B, 136B, 138B may be formed of a polymeric material such as polymeric enamel, paper and oil, silicone rubber, polyvinyl chloride (PVC), polyethylene, polypropylene, and/or mixtures, blends and co-polymers thereof.

According to some embodiments, the insulation covers 132B, 134B, 136B, 138B are selectively colored in accordance with telephone service wiring convention. In particular, the insulation cover 132B may be colored red, the insulation cover 134B may be colored green, the insulation cover 136B may be colored yellow, and the insulation cover 138B may be colored black.

With reference to FIG. 1, according to some embodiments, the thickness A of the partition wall 120 is at least 1 mm. According to further embodiments, the thickness A is between about 1 and 2 mm. According to some embodiments, the thicknesses B and C of the walls 122 and 124 are at least 1 mm. According to some embodiments, the thicknesses B and C are between about 1 and 2 mm. According to some embodiments, the passages 112, 114 are sized to allow substantially free movement of the twisted conductor member pairs 131, 133 therein. According to some embodiments, the diameter D of the passages 112, 114 is at least 2 mm. According to some embodiments, the diameter D is between about 2 and 4 mm.

According to some embodiments, the conductor members of the conductor member pairs 131 and 133 have a twist rate of at least 0.25 twists per inch. According to some embodiments, the twist rate is between about 0.25 and 0.5 twists per inch. The conductor members of the conductor member pairs 131, 133 may be twisted in the same or opposite directions. The twist rate may be uniform along the length of the cable 100. The same twist rate may be used for both conductor member pairs 131, 133.

With reference to FIG. 3, a telephone service system 10 according to embodiments of the present invention is shown therein. The system 10 includes a length of the cable 100 and serves to provide at least one telephone service within the architectural structure 20 (which is schematically shown in FIG. 3). The architectural structure 20 may be, for example, a residence or house, a commercial building, or the like.

The telephone service system 10 includes a central office 30 which may be operatively connected to a public switched telephone network (PSTN) and the Internet (via an internet service provider (ISP), for example) or other data network. The central office 30 will typically include a switch 30A connected to the PSTN and a transceiver 30B (e.g., a DSLAM) connected to the Internet or other data network.

The central office 30 may be connected to a remote terminal 34 by a connector cable 31. The remote terminal 34 may include a power supply and connectors. The remote terminal 34 may be proximate but spaced apart from the structure 20. The remote terminal 34 is operatively connected to a junction box or network interface device (NID) 36 by a cable 35 or the like. The cable 35 may include multiple lines. The network interface device 36 is associated with and may be mounted on the structure 20. For example, the network interface device 36 may be secured to an exterior wall of the architectural structure 20. The network interface device 36 includes connectors 37, 38. Each of the connectors 37, 38 is connected to a different line of the cable 35 from the remote terminal 34. The remote terminal 34 may include connectors in addition to those corresponding to the connectors 37, 38. In other embodiments, the central office 30 is connected to the cable 35 without the remote terminal 34.

Typically, the network interface device 36 will represent the demarcation between the telephone service provider network (including the PSTN), on one side, and the in-home circuitry or subscriber loop or line, on the other side. The portion of the telephone service system 10 on the telephone service provide network side of the network interface device 36 is commonly owned by and the responsibility of the telephone service provider. The subscriber loop is commonly owned by and the responsibility of the subscriber to the telephone service (e.g., the homeowner). The network interface device 36 may be used for connecting new service lines to the subscriber loop and for isolating the subscriber loop from the main network to locate circuit defects.

The network interface device 36 is connected to a jack assembly 40 by the cable 100. The cable 100 is routed through the architectural structure 20. The cable 100 serves as an intermediate structure or building distribution cable. The cable 100 or a part thereof may be routed through a wall cavity 26 between wall facings of the architectural structure 20. For example, the wall cavity 26 may be defined between the exterior wall 22 and an interior wall 24, or between a pair of interior wall panels. Additionally or alternatively, the cable 100 may be routed beneath a floor or over a ceiling of the architectural structure 20. The cable 100 may also be routed on an exposed wall surface (i.e., on a wall surface opposite the wall surface facing the cavity 26). The system 10 may include additional drops or jacks connected to the network interface device 36 directly or through the jack assembly 40 (i.e., in a daisy chain configuration).

As shown, the jack assembly 40 includes two jacks 42, 44. The jacks 42, 44 are shown schematically and may be any suitable type of jack. For example, either or both of the jacks 42, 44 may be an RJ11, RJ21, or RJ45 jack, for example. As discussed below, in accordance with some embodiments, the jacks 42, 44 may be combined into a single jack.

Figure 4:
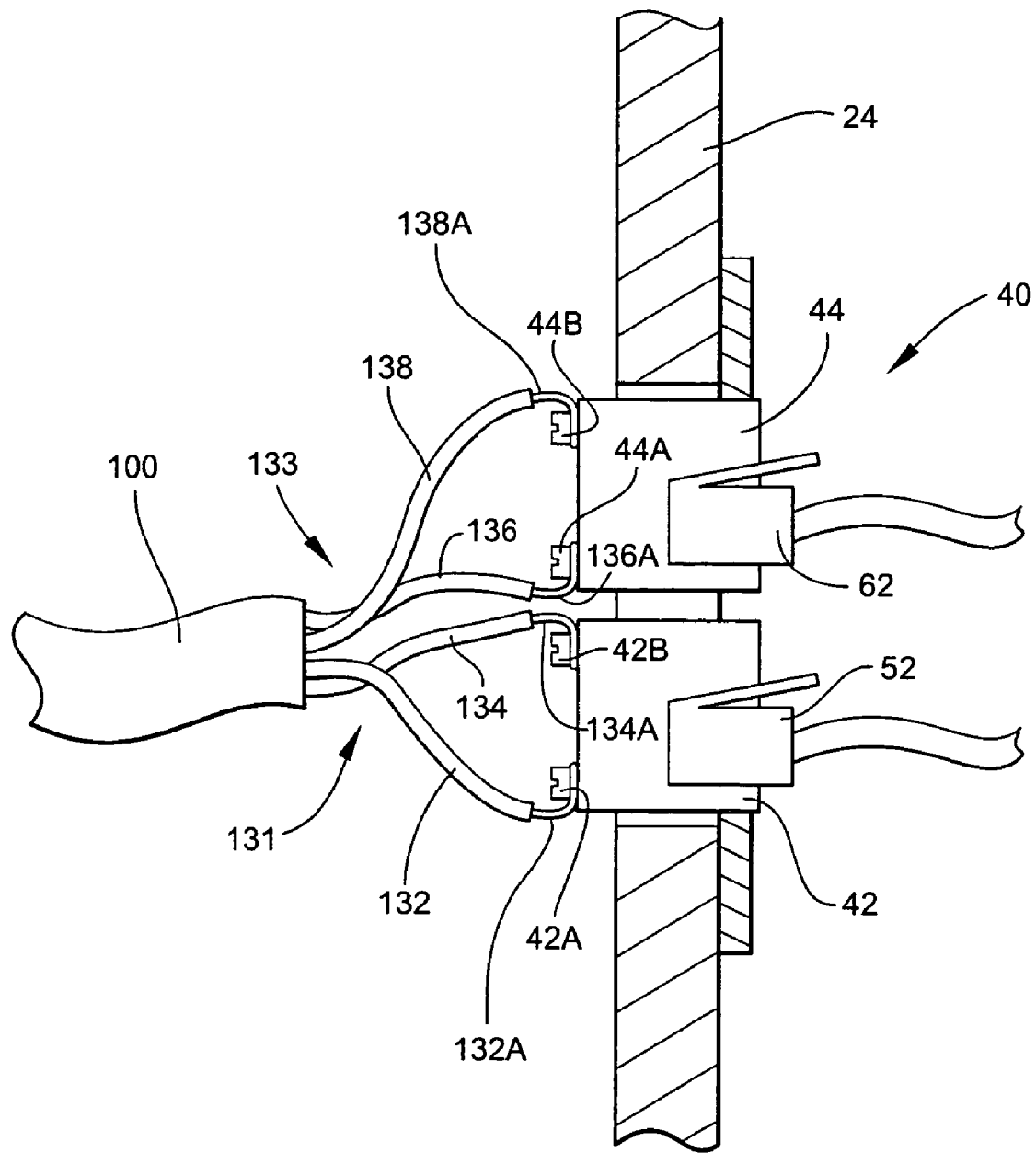
FIG. 4 is a fragmentary, enlarged, cross-sectional view of the telephone service system of FIG. 3.

The conductor member pair 131 is electrically connected to the connector 37 (which serves as a first telephone service supply connector) of the network interface device 36 on one end, and to the jack 42 on the other end. The conductor member pair 133 is electrically connected to the connector 38 (which serves as a second telephone service supply connector) of the network interface device 36 on one end, and to the jack 44 on the other end. As shown in FIG. 4, the conductors 132A, 134A of the conductor members 132, 134 are electrically connected and secured to the jack 42 by posts 42A, 42B. Similarly, the conductors 136A, 138A of the conductor members 136, 138 are electrically connected and secured to the jack 44 by posts 44A, 44A. Other types of connections may be used to electrically connect and secure the conductor members 132, 134, 136, 138 to the jacks 42, 44. Likewise, any suitable mechanism may be used to secure the opposite ends of the conductor members 132, 134, 136, 138 to the connectors 37, 38.

Suitable devices can be connected to either or both of the jacks 42, 44. For example, a terminal 50 capable of using a POTS signal may be connected to the jack 42 by a plug and line 52. In this case, the jack 42 is connected to the PSTN via the conductor member pair 131 (which serve as tip wire and ring wire), the connector 37, the connection 35, the remote terminal 34, the line 31, and the central office 30 to provide plain old telephone service (POTS). The terminal 50 may include, but is not limited to, a standard telephone, a low (voice) bandwidth modem, and/or a facsimile machine.

A terminal 60 may be connected to the Internet or the like via the conductor member pair 133, the connector 38, the line 35, the remote terminal 34, the line 31, and the central office 30 to provide digital, broadband or high frequency signal service (e.g., DSL or xDSL including, for example, ADSL, HDSL, ISDL, MSDL, RADSL, SDSL, VDSL, and/ or VoDSL). The terminal 60 may be a transceiver which is in turn connected to a computer 63 or the like, for example.

Alternatively, both of the terminals 50, 60 could be connected to a respective line of the PSTN, or to a respective non-PSTN line. For example, the terminal 60 could also be a standard telephone with the conductor member pair 133 connecting to a second telephone line associated with the PSTN to provide a POTS signal.

According to some embodiments, the jacks 42, 44 may be combined into a single jack to which all four of the conductors 132A, 134A, 136A, 138A are connected. A terminal capable of using both service lines may be connected to the combined jack. Alternatively, a line 1/line 2 adapter may be connected to the combined jack to allow one or two terminals to access the two lines separately.

The cable 100 and the system 10 and methods for forming the system 10 according to embodiments of the present invention may provide a number of advantages over conventionally employed cable, systems and methods. The partition wall 120 serves to partially or fully electrically insulate the conductor member pair 131 from the conductor member pair 133 by means of the electrically insulative material and by maintaining the spacing between and relative positions of the conductor member pairs 131, 133. In this way, the partition wall 120 may separate the conductor member pairs 131, 133, thereby reducing or eliminating cross talk between the conductor member pairs 131, 133 and their associated circuits. The twisting of each pair 131, 133 may also serve to reduce cross talk between the conductor members of a given pair.

The cable 100 may be cost effectively manufactured and installed. The conductors of the cable 100 are well protected. The integral and unitary construction of the sheath 110 can provide improved integrity and uniformity. In particular, the passages 112, 114 may serve as protective enclosures that inhibit or prevent crushing, crimping, etc., of the twisted conductor member pairs which might otherwise occur during installation of the telephone wiring. The cables, methods and systems of the present invention may simplify interior wiring for technicians and consumers/subscribers and may improve the quality of service provided.

Figure 5:
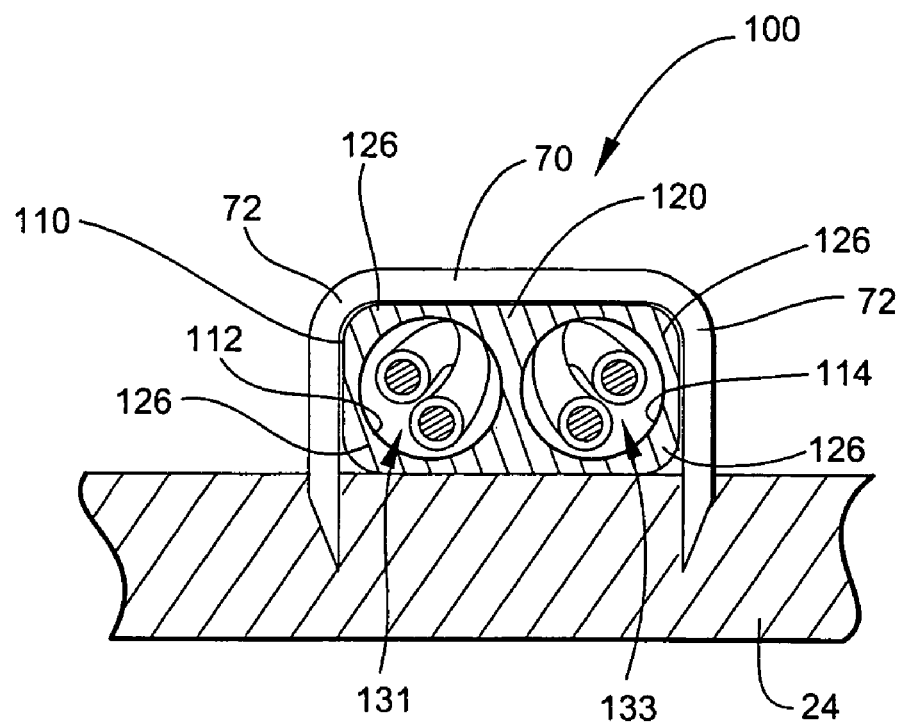
FIG. 5 is a cross-sectional view of the cable of FIG. 1 secured to a wall by a staple.

With reference to FIG. 5, the cable 100 can be secured to a mounting surface such as a wall (e.g., the wall 24) using a fastener such as a staple 70. The corners 126 of the sheath 110 can generally complement the interior corners 72 of the staple 70. In this manner, a good securement of the cable 100 may be provided while reducing the risk of crushing the passages 112, 114 and the conductor member pairs 131, 133. Other types of fasteners may be used in addition to or as an alternative to the staple 70 as shown.

According to further embodiments, the sheath 120 may be formed of multiple pieces that are subsequently joined by adhesive, welding, or the like to form an integral sheath. According to further embodiments, the cable 100 may have a different cross-sectional shape than rectangular. For example, the cable 100 may be oval or bi-lobal in shape. The cable may include exactly two conductor member pairs 131, 133 as shown or, alternatively, may include more than two conductor member pairs (each being twisted and housed in a respective sheath passage).

Figure 6:
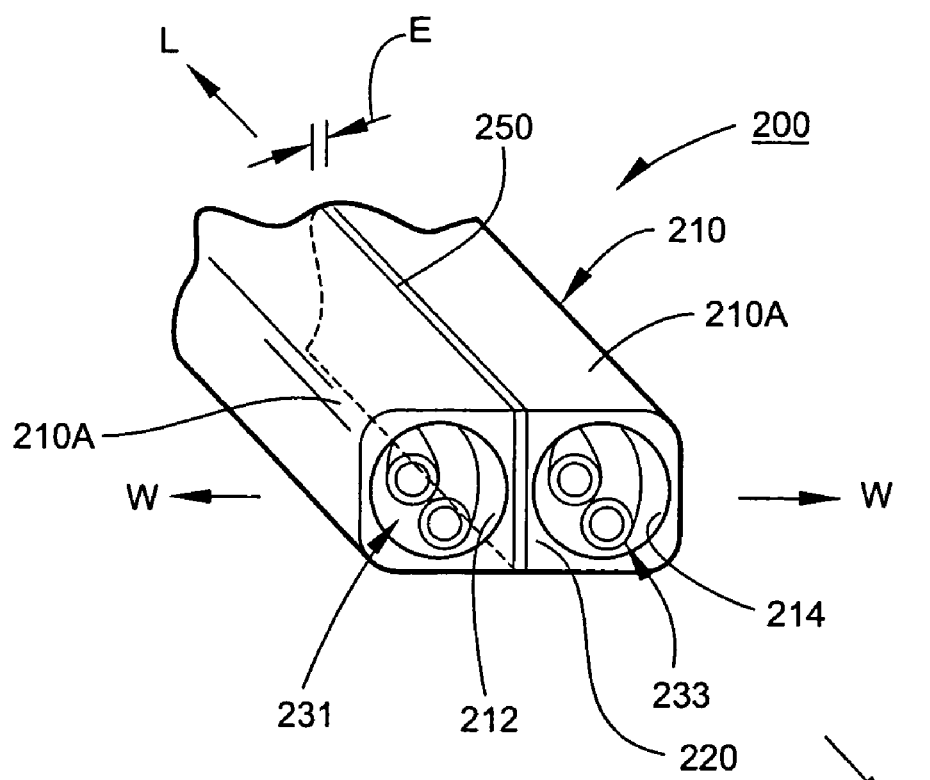
FIG. 6 is a fragmentary, perspective view of a cable according to further embodiments of the present invention.

With reference to FIG. 6, a cable 200 according to further embodiments of the present invention is shown therein. The cable 200 corresponds to the cable 100 except as follows. The sheath 210 of the cable 200 includes body portions 210A, 210B and a reinforcement member 250 integral with the body portions 210A, 210B. The reinforcement member 250 is positioned within and serves as a part of the partition wall 220. The reinforcement member 250 extends longitudinally along the cable 200 and is formed of a more rigid material than the material of the body portions 210A, 210B (including the outer walls). According to some embodiments, the reinforcement member 250 is bonded, adhered or otherwise maintained in fixed relation with the body portions 210A, 210B. The reinforcement member 250 may help to resist crushing of the partition wall 220 and the passages 212, 214, thereby protecting the conductor member pairs 231, 233.

According to some embodiments, the reinforcement member 250 is formed of an electrically insulative material. The reinforcement member 250 may be formed of a polymeric material such as a rigid or semi-rigid plastic. According to some embodiments, the reinforcement member 250 is formed of PVC, polyethylene, polypropylene, polystyrene, ABS, polycarbonate, polyester, nylon, and/or mixtures, blends and co-polymers thereof. According to some embodiments, the reinforcement member 250 is formed of a material having a Young's modulus of at least 1 GPa. According to some embodiments, the material of the reinforcement member 250 is at least 50% stiffer than the material of the sheath body portions 210A, 210B.

The reinforcement member 250 may be a simple continuous plate or flat ribbon extending perpendicular to the length-wise axis L-L and the width-wise axis W-W (i.e., the dimension extending perpendicular to the axis L-L and directly through the passages 212, 214) of cable 200 as shown in FIG. 6 in order to provide improved cable side-to-side flexibility. The plate-shaped reinforcement member 250 is positioned between and shaped to partition the passages 212, 214.

According to some embodiments and as shown, the sheath has a cross-sectional shape that is a rectangle with unequal sides and the reinforcement member 250 extends perpendicular to the smaller width of the sheath 210. In this way, when the sheath is laid flat against a surface on one of its broad sides, the reinforcement member 250 is perpendicular to the support surface to resist crushing of the sheath in the direction of the support surface.

According to further embodiments, the reinforcement member 250 may be formed in a shape different than that in shown FIG. 6. For example, the reinforcement member 250 may not extend fully from the top surface to the bottom surface of the sheath 210. The partition wall 220 and the reinforcement member 250 may be configured such that the reinforcement member 250 defines a portion of one or both of the passages 212, 214. The reinforcement member 250 may constitute the entirety of the partition wall between the passages 212, 214. The cross-sectional shape of the sheath 210 may also be modified.

The cable 200 may be formed by any suitable technique. The reinforcement member 250 may be co-extruded with the body portions 210A, 210B of the sheath 210. Alternatively, the reinforcement member 250 may be adhered to the body portions 210A, 210B. As a further alternative, the reinforcement member 250 may be preformed and the body portions 210A, 210B of the sheath 210 may be extruded thereover.

According to some embodiments, the reinforcement member 250 has a width E parallel to the axis W-W of the cable 200 of at least 0.5 mm. According to some embodiments, the width E is between about 0.5 and 1.5 mm.

According to some embodiments, the partition wall (e.g., the partition wall 120 or 220) and/or the reinforcement member may be formed of an electrically conductive material such as a metal.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A method for wiring an architectural structure for telephone service, the method comprising:
   a) providing a cable including:
      a unitary sheath including first and second longitudinally extending sheath passages and a partition wall extending therebetween; and first and second pairs of conductor members, each of the conductor members being twisted about the other conductor member of its pair, each of the conductor members including a conductor and an insulation cover;

wherein the first pair of conductor members is disposed in the first sheath passage and the second pair of conductor members is disposed in the second sheath passage such that the sheath surrounds the first and second pairs of conductor members and the first pair of conductor members is separated from the second pair of conductor members by the partition wall;

b) routing the cable through the architectural structure;

c) routing the cable to a telephone service supply connection; and d) electrically connecting at least the conductors of the first pair of conductor members to the telephone service supply connection.

2. The method of claim 1 wherein neither of the conductor members of the first pair of conductor members is twisted about either of the conductor members of the second pair of conductor members.

3. The method of claim 1 wherein the telephone service supply connection forms a part of a network interface device associated with the architectural structure.

4. The method of claim 1 further including:
routing the cable to a jack within the architectural structure; and
electrically connecting at least the conductors of the first pair of conductor members to the jack.

5. The method of claim 4 further including electrically connecting a telephone to the jack.

6. The method of claim 4 further including electrically connecting the conductors of the second pair of conductor members to a second jack.

7. The method of claim 6 further including:
routing the cable to a second telephone service supply connection; and
electrically connecting the conductors of the second pair of conductor members to the second telephone service supply connection.

8. The method of claim 6 wherein the second telephone service supply connection is a broadband service connection.

9. The method of claim 1 wherein the sheath is formed of a polymeric material.

10. The method of claim 1 wherein the partition wall is formed of an electrically insulative material.

11. The method of claim 1 wherein the sheath is continuously unitarily formed.

12. The method of claim 1 wherein the sheath as formed has a rectangular cross-section.

13. The method of claim 1 further including the step of securing the cable to the architectural structure using a fastener, wherein the fastener has a shape complementary to the shape of the sheath.

14. The method of claim 1 wherein the insulation covers of the first pair of conductor members are red and green, respectively, and the insulation covers of the second pair of conductor members are yellow and black, respectively.

15. A system for wiring an architectural structure for telephone service, the system comprising:
a) a telephone service supply connection;
b) a cable including:
a unitary sheath including first and second longitudinally extending sheath passages and a partition wall extending therebetween; and first and second pairs of conductor members, each of the conductor members being twisted about the other conductor member of its pair, each of the conductor members including a conductor and an insulation cover;

wherein the first pair of conductor members is disposed in the first sheath passage and the second pair of conductor members is disposed in the second sheath passage such that the sheath surrounds the first and second pairs of conductors and the first pair of conductor members is separated from the second pair of conductor members by the partition wall;

c) wherein the cable is routed through the architectural structure;

d) wherein the cable is routed to the telephone service supply connection; and e) wherein at least the conductors of the first pair of conductor members are electrically connected to the telephone service supply connection.

16. The system of claim 15 including a network interface device mounted on the architectural structure, and wherein the telephone service supply connection forms a part of the network interface device.

17. The system of claim 15 further including a jack within the architectural structure, and wherein:
the cable is routed to the jack; and
at least the conductors of the first pair of conductor members are electrically connected to the jack.

18. The system of claim 15 wherein the sheath is formed of a polymeric material.

19. A cable comprising:
a) a unitary, polymeric sheath including first and second longitudinally extending sheath passages and a partition wall extending therebetween; and
b) first and second pairs of conductor members, each of the conductor members being twisted about the other conductor member of its pair, each of the conductor members including a conductor and an insulation cover;
c) wherein the first pair of conductor members is disposed in the first sheath passage and the second pair of conductor members is disposed in the second sheath passage such that the sheath surrounds the first and second pairs of conductors and the first pair of conductor members is electrically insulated from the second pair of conductor members by the partition wall.

20. The cable of claim 19 wherein the sheath is continuously unitarily formed.

21. A cable comprising:
a) a unitary sheath including first and second longitudinally extending sheath passages and a partition wall extending therebetween; and
b) first and second pairs of conductor members, each of the conductor members being twisted about the other conductor member of its pair, each of the conductor members including a conductor and an insulation cover;
c) wherein the first pair of conductor members is disposed in the first sheath passage and the second pair of conductor members is disposed in the second sheath passage such that the sheath surrounds the first and second pairs of conductors and the first pair of conductor members is separated from the second pair of conductor members by the partition wall; and
d) wherein the sheath as formed has a rectangular cross-section.

22. A cable comprising:
a) a unitary sheath including first and second longitudinally extending sheath passages and a partition wall extending therebetween; and
b) first and second pairs of conductor members, each of the conductor members being twisted about the other conductor member of its pair, each of the conductor members including a conductor and an insulation cover;
c) wherein the first pair of conductor members is disposed in the first sheath passage and the second pair of conductor members is disposed in the second sheath passage such that the sheath surrounds the first and second pairs of conductors and the first pair of conductor members are separated from the second pair of conductor members by the partition wall.

23. The cable of claim 22 wherein the partition wall is formed of an electrically insulative material and the first pair of conductor members is electrically insulated from the second pair of conductor members by the partition wall.

24. The cable of claim 22 wherein the reinforcement member forms at least a part of the partition wall.

25. The method of claim 11 including unitarily extending the sheath.

26. The cable of claim 20 wherein the sheath is unitarily extruded.

27. The cable of claim 26 wherein the sheath as formed has a rectangular cross-section.

* * * * *

UNITED STATES PATENT AND TRADEMARK OFFICE
CERTIFICATE OF CORRECTION

PATENT NO. : 7,327,839 B2 Page 1 of 1
APPLICATION NO. : 10/818276
DATED : February 5, 2008
INVENTOR(S) : Smith et al.

It is certified that error appears in the above-identified patent and that said Letters Patent is hereby corrected as shown below:

On the Title Page:
Item 73: Should read --AT&T BLS Intellectual Property, Inc. formerly known as BellSouth Intellectual Property Corporation--

In the Claims:
Column 12, Claim 25, Line 8: Please correct "extending"
To read --extruding--

Signed and Sealed this

Third Day of June, 2008

JON W. DUDAS
*Director of the United States Patent and Trademark Office*